United States Patent [19]

Flack

[11] 4,359,706
[45] Nov. 16, 1982

[54] MAGNET POLE PIECES AND POLE PIECE EXTENSIONS AND SHIELDS

[76] Inventor: Arnold Flack, 15913 Pennsylvania, Southfield, Mich. 48075

[21] Appl. No.: 104,786

[22] Filed: Dec. 18, 1979

[51] Int. Cl.$^3$ .................... H01F 3/00; H01F 7/02; H01F 7/08
[52] U.S. Cl. .................... 335/281; 335/297; 335/304; 335/306
[58] Field of Search .............. 335/281, 296, 297, 298, 335/304, 306, 216

[56] References Cited

U.S. PATENT DOCUMENTS

| | | | |
|---|---|---|---|
| 2,715,166 | 8/1955 | Fitch | 335/281 X |
| 2,804,548 | 8/1957 | Ruska | 335/306 X |
| 3,325,757 | 6/1967 | Gang | 335/306 X |
| 3,417,356 | 12/1968 | Tschopp | 335/298 |
| 3,781,736 | 12/1973 | Parker | 335/304 |

Primary Examiner—Robert J. Hickey
Attorney, Agent, or Firm—Hauke and Patalidis

[57] ABSTRACT

Pole piece structures for permanent magnets and electromagnets, more particularly for superconducting electromagnets, and pole piece extensions and shields adapted, separately and in combination, to achieve a high concentration of the magnetic flux along the principal magnetic axis of the pole pieces, and preventing magnetic flux leakage and dispersion. The pole pieces are preferably conical or frusto-conical, or in the form of hollow cylinders or conical cylinders or, alternatively, provided with a tapered step ending in a pointed cylinder, a flat cylinder, or a hollow cylinder. The pole piece configurations provide a high concentration of magnetic flux intensity in the magnetic gap between the pole pieces either along the centerline of the pole pieces or in a cylindrical space disposed axially along the centerline of the pole pieces. Pole piece extensions, or field concentration members in the form of cylindrical, frusto-conical, helical shields or, alternatively, in the form of cylindrical, frusto-conical, single or multiple concentric shields, are disposed around the pole pieces as a further arrangement for shaping the magnetic flux and concentrating the high intensity magnetic lines of force in an appropriate region of the magnetic gap between the ends of the pole pieces, thus producing a high flux intensity in a predetermined region of the gap space in applications where such a controlled high intensity magnetic flux is required, as, for example, for magnetically confining a critical mass of ions, such as deuterons and tritons in an energy fusion reaction.

9 Claims, 24 Drawing Figures

MAGNET POLE PIECES AND POLE PIECE EXTENSIONS AND SHIELDS

BACKGROUND OF THE INVENTION

There are many technologies and scientific areas where it is desirable to create and control strong magnetic fields. Strong magnetic fields have many applications, for example, in MHD (magnetohydrodynamic) generation of energy and in nuclear fusion processes, which require magnetic confinement of a plasma, in mass spectroscopy in which a narrow beam of ions is deflected by a strong magnetic field, in NMR (nuclear magnetic resonance) spectrometers, and in concentration of microwaves for communication or for cancer treatment. Strong magnetic fluxes are generally obtained by means of superconductive electromagnets which, by using inductance coils made of superconductor materials such as niobium, titanium, or columbium, or alloys thereof cooled to cryogenic temperatures are capable of producing flux densities of 20,000 to 140,000 gauss.

One problem associated with any magnets or electromagnets, even those capable of producing only relatively weak magnetic fields as well as those capable of producing very high flux intensities, is that of magnetic flux leakage and dispersion to the ambient. The higher the magnetic flux created, the greater of course the problems presented by confinement of the magnetic field and controlled concentration of the magnetic lines of force, so that the high intensity magnetic flux is concentrated in a desirable region of the magnetic field such as, for example, along the centerline of the pole piece gap, or along a cylindrical or frusto-conical periphery concentric with the longitudinal axis of the magnetic gap, rather than obtaining a magnetic field having a conventional barrel shape with maximum deflection of the field being at mid-distance between the pole piece faces.

Attempts have been made in the past to provide magnetic concentrators or shields, sometimes associated with the pole pieces of a magnet or electromagnet, to reduce flux leakage, or to provide a better control of the shape of the magnetic flux between the opposite pole pieces of the magnet or electromagnet. An example of such shield structure can be found in U.S. Pat. No. 3,781,736 which discloses providing the pole pieces of a magnet with sleeves or plates engaged with the peripheral surface of the pole pieces, and in U.S. Pat. No. 3,417,356 disclosing hollow magnetic elements placed around the opposed pole pieces of a magnet to effectuate a correction of the field gradient at the edge of the magnetic field in the air gap between the pole pieces.

SUMMARY OF THE INVENTION

The present invention provides pole pieces for magnets or electromagnets of particular structure permitting to shape the magnetic field between opposed pole pieces of a magnet with a desirable configuration, and, by means of pole piece extensions, or field correction members, the present invention enables the magnetic field to be shaped substantially rectilinearly, with a high concentration of magnetic lines of force where most required.

The many objects and advantages of the invention will become apparent to those skilled in the art when the following description of the best modes contemplated for practicing the invention is read in conjunction with the accompanying drawing, wherein like numerals refer to like or equivalent parts, and in which:

DETAILED DESCRIPTION OF THE PREFERRED EMBODIMENTS

Figure 1:
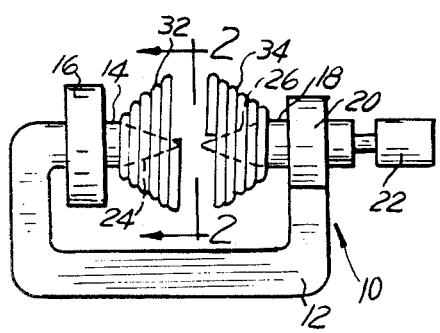
FIG. 1 is a schematic representation of a variable gap electromagnet provided with pole piece extensions according to the present invention.
Figure 2:
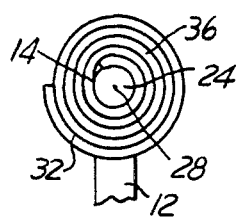
FIG. 2 is an end elevation view of one of the pole pieces and extensions as seen from line 2—2 of FIG. 1.
Figure 3:
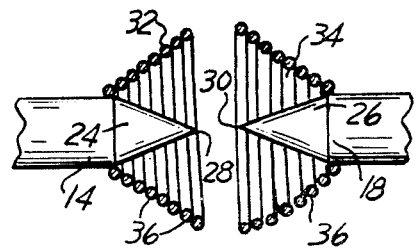
FIG. 3 is a longitudinal partial section of the structure of FIG. 1.

Referring to the drawing, and more particularly to FIG. 1, there is illustrated in a schematic simplified manner a superconductive electromagnet 10 comprising a substantially U-shaped ferromagnetic core 12 provided at one end with a tapered conical pole piece 14. An induction coil 16, made of windings of superconductive material such as niobium, titanium, columbium, tin, or the like, is disposed around the ferromagnetic core 12, and is maintained at cryogenic temperatures by means of a jacket through which flows liquid hydrogen, liquid helium, or the like. The pole piece 14, in the structure illustrated, is stationary. The other pole piece 18 is disposed linearly movable in a slide 20, formed at an end of the ferromagnetic core 12, under the action of an appropriate servo motor drive 22, such that the movable pole piece 18 is linearly displaceable toward and away from the stationary pole piece 14 for the purpose of providing a controllably variable magnetic gap between the pole pieces. As best shown at FIGS. 2 and 3, both pole pieces 14 and 18 are provided with a conical end face 24 or 26, respectively, terminating in a sharp apex point 28 or 30, respectively. As is well known, conical magnet pole pieces terminating in a point provide highest concentration of the magnetic flux along a straight line between the pole piece points. Although, the structure of FIG. 1 comprises a movable pole piece 18 providing a variable air gap, it will be readily appreciated that the pole piece 18 may be made stationary, by being formed integrally at the end of the magnetic core 12.

A pole piece extension, or field correction member, in the form of a magnetic field shield 32 is disposed around the pole piece 14, and a similar pole piece extension in the form of a magnetic shield 34 is disposed around the pole piece 18, the magnetic shields 32 and 34 being each in the form of a frusto-conical member consisting of diverging helical spirals of a wire 36 made of magnetic or ferromagnetic material. The wire 36 is preferably circular in section as shown, but it may be made rectangular or square in section, for example. The consecutive spirals of wire 36 forming one shield are helically disposed in one direction, and the spirals of wire 36 forming the other shield are preferably helically disposed in an opposite direction, one being a clockwise direction and the other a counterclockwise direction. The spirals may be adjoining, as illustrated, or they may be disposed such as to not engage one another, with a narrow space between consecutive spirals. The smaller diameter end of each helical shield 32 or 34 is fastened around the periphery of the respective pole piece 14 or 18, proximate the base of the conical end face 24 or 26 of the respective pole piece. Diverse modes of attachment of the shield 32 or 34 to the pole piece 14 or 18 may be used, such as forming the first spiral or spirals of each shield to a diameter smaller than the diameter of the pole piece for frictionally and resiliently holding the shield in position, as illustrated, or by means of a shallow groove formed around the periphery of the pole piece in which is resiliently engaged the first spiral of the shield. Alternatively, a clip made of non-magnetic material may be used, or a bonding agent may be used, for holding the shield 32 or 34 in position.

The shields 32–34 surrounding the pole pieces 14–18 have for effect to confine the magnetic field between the pole pieces substantially within the volume of space surrounded by the shields, and to effectively straighten the magnetic lines of force, such as to change the shape of the magnetic field from a barrel-shape form, with maximum concentration of the magnetic intensity along the line joining the points 28 and 30 of the pole pieces, to a cylindrical or even to a pinch effect magnetic field.

Figure 4:
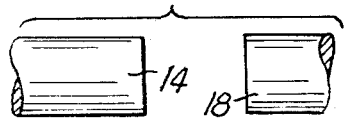
FIG. 4 is a partial view of a pair of conventional cylindrical magnet pole pieces.
Figure 5:
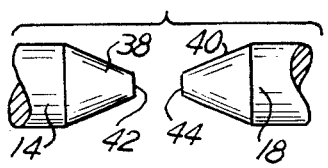
FIGS. 5-10 are views similar to FIG. 4 but illustrating diverse examples of pole piece configurations according to the present invention.
Figure 6:
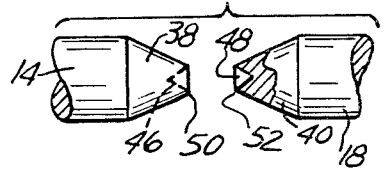

Although the helical shields 32 and 34 have been illustrated at FIGS. 1–3 as used in conjunction with conical pole pieces, it will be appreciated that they are also effective in confining any magnetic field and in creating a substantial pinch effect, such as the magnetic field obtained by the conventional cylindrical pole pieces 14 and 18, FIG. 4, as well as the magnetic fields obtained by the pole piece structures more particularly contemplated by the invention, examples of which are illustrated at FIGS. 5–10. At FIG. 5, the pole pieces 14–18 are provided with frusto-conical ends 38–40 having circular end faces 42–44, with the result that the unshielded magnetic field tends to be concentrated in a cylindrical space limited at its base by the circular faces 42 and 44. FIG. 6 represents a pair of opposed pole pieces 14 and 18 each provided with a frusto-conical surface 38 or 40 having at its tip a conical cavity 46 or 48, respectively. As the maximum intensity of the magnetic flux corresponds to the areas of the opposed pole pieces 14 and 18 which are in closest proximity, the unshielded magnetic field tends to have maximum concentration about the periphery of a cylindrical space limited by the projection of the sharp edges 50 and 52 formed by the recessed conical surfaces 46 and 48 where they meet respectively with the frusto-conical surfaces 38 and 40.

Figure 7:
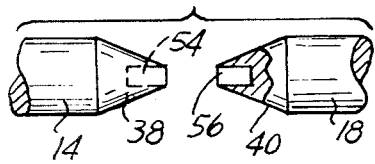
Figure 8:
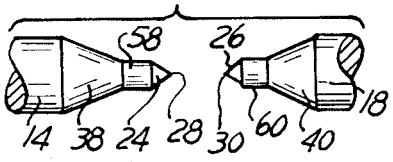

An unshielded magnetic field of generally the same transverse flux density is obtained by means of the pole pieces 14 and 18 of FIG. 7 provided with frusto-conical surfaces 38 and 40 having cylindrical recesses 54 and 56 at their tip. FIG. 8 illustrates an example of pole pieces 14 and 18 each having a frusto-conical surface 38 or 40 ending in a reduced diameter cylindrical portion 58 or 60, in turn terminating in a conical pointed surface 24 or 26. Such an arrangement of pole pieces also provides a concentration of the magnetic flux intensity along the line joining the sharp points 28 and 30 of the pole pieces conical surface 24 and 26, and has been found even more effective than the pole piece structure of FIGS. 1–3 to provide maximum concentration of the magnetic flux intensity along that line.

Figure 9:
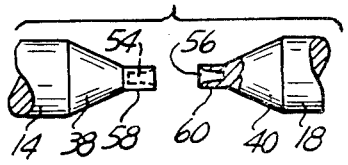

FIG. 9 illustrates a pair of pole pieces 14–18 each provided with frusto-conical portions 38–40 terminating in a cylindrical portion 58–60 of reduced diameter, provided with a cylindrical recess 54–56. At FIG. 10, the pole pieces 14–18, while of the same general configuration as illustrated at FIG. 9, are provided with conical cavities 46–48 instead of cylindrical recesses as in FIG. 9.

Figure 10:
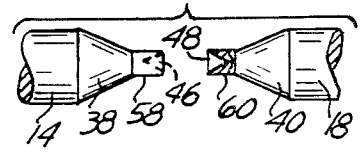

Although the pole piece arrangements of FIG. 8, FIG. 9 and FIG. 10 permit to obtain magnetic fields of the same general configuration as provided respectively by the pole piece arrangements of FIGS. 1–3, FIG. 4, FIG. 5 and FIG. 6, they further provide a substantially narrower magnetic flux concentrated in a relatively narrow area. It will be appreciated that irrespective of the pole piece shape which is utilized, the shape of the magnetic field and the concentration of the magnetic lines of force are further substantially improved by providing the pole pieces with the extensions of FIGS. 1–3, or with the alternate pole piece extension structures illustrated at FIGS. 11–16.

Figure 11:
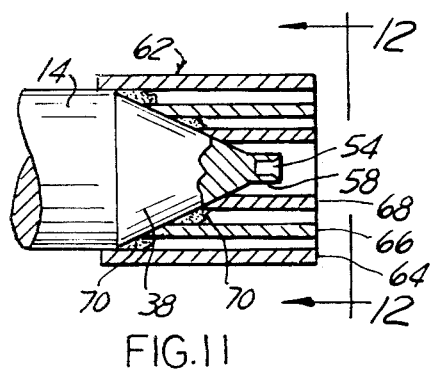
FIG. 11 is a partial schematic illustration of a magnet pole piece according to the present invention provided with a modification of pole piece extensions.
Figure 12:
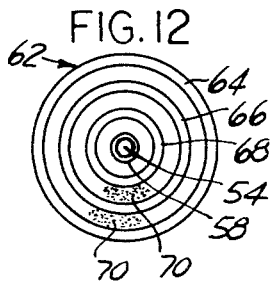
FIG. 12 is an end view from line 12—12 of FIG. 11.

At FIGS. 11–12 there is shown a pole piece extension, or field correction member, in the form of a generally cylindrical magnetic shield 62, the pole piece 14 having the general configuration illustrated at FIG. 9, namely being provided with a frusto-conical portion 38 terminating into a reduced diameter cylindrical portion 58 provided with a cylindrical recess 54. The magnetic shield 62 is made of a plurality of concentric tubular members 64, 66 and 68 of equal thickness, made of magnetic or ferromagnetic material and held in assembly by means such as binding rings 70 made of a non-magnetic adhesive potting material such as an epoxy resin or the like. The inner diameter of the outer tubular member 64 has a dimension permitting it to fit over the peripheral cylindrical portion of the pole piece 14 at the foot of the frusto-conical portion 38. The tubular member 64 is held attached thereto by any convenient means such as set screws made of non-magnetic material, or the like. Instead of all the concentric tubular members 64–68 being made with the same wall thickness, a magnetic shield assembly 62', FIG. 13, may be used wherein the individual concentric tubular members 64, 66 and 68 are of progressively decreasing wall thickness from the outermost shield to the innermost shield, disposing the magnetic shield tubular member 64 of greatest thickness at the periphery of the magnetized space having for effect to be most effective in confining the magnetic field and in providing a pinch effect to the magnetic lines of force.

Figure 13:
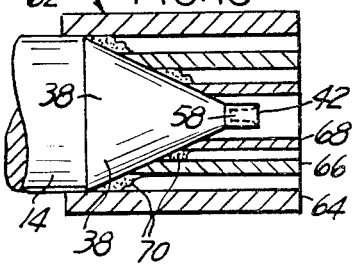
FIG. 13 is a view similar to FIG. 11 but showing a modification thereof.
Figure 14:
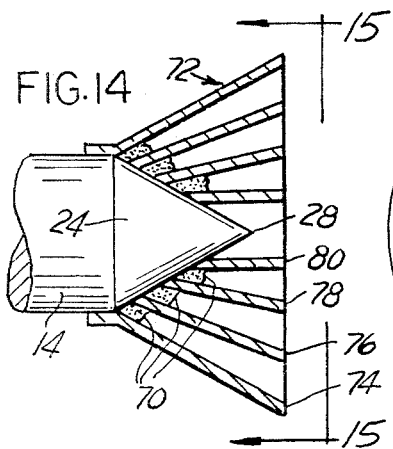
FIG. 14 is a view similar to FIG. 11 but showing a further modification thereof.
Figure 15:
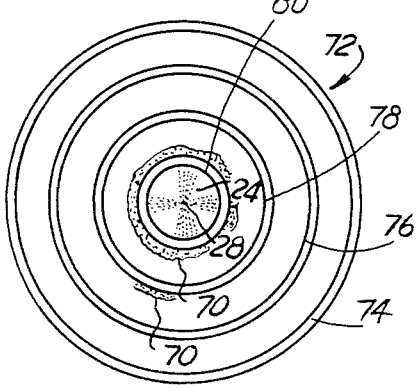
FIG. 15 is an end view from line 15—15 of FIG. 14.
Figure 16:
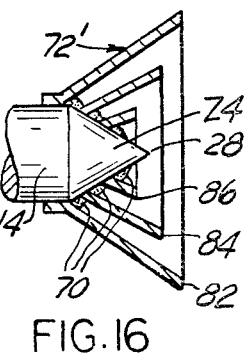
FIG. 16 is a view similar to FIG. 11 but showing another modification thereof.

At FIGS. 14–15, there is shown a magnetic shield 72 for a pole piece 14 having a conical end 24 terminating in an apex point 28, although the magnetic shield 72, like the magnetic shields 62 of FIGS. 11–12, 62' of FIG. 13 and 32 or 34 of FIGS. 1–3 could be used with any pole piece configuration. The magnetic shield 72 comprises a plurality of individual concentric conical diverging tubular members 74, 76, 78 and 80 made of magnetic material and held in assembly by means of molded non-magnetic concentric adhesive rings 70, or any other convenient means. A similar arrangement is illustrated at FIG. 16, with the difference, however, that the concentric individual diverging conical tubular members, such as tubular members 82, 84 and 86 forming the magnetic shield assembly 72', may optionally be provided with are of decreasing wall thickness from the outermost conical tubular member 82 to the innermost conical tubular member 86, and furthermore that the individual tubular members 82-86 instead of having their terminal edges disposed in a single plane, as in the structure of FIGS. 14-15, have their terminal edges progressively staggered, the outermost tubular member 82 having its terminal edge projecting forward of the terminal edge of the intermediary member 84 which in turn has its terminal edge projecting forward of the edge of the innermost member 86. The magnetic pole piece extensions or shields 62, 62', 72 and 72' are preferably used in pair of similar symmetrically configured structures, one such extension being attached to each one of a pair of opposed pole pieces, although only one pole piece and extension assembly is illustrated at FIGS. 11-16.

The magnetic pole piece extensions, or field correction members, of the present invention, when used in conjunction with the magnetic pole pieces of the invention, are most effective for certain applications when attached proximate the end of the pole pieces. Examples of such structures are illustrated at FIGS. 17-24.

Figure 17:
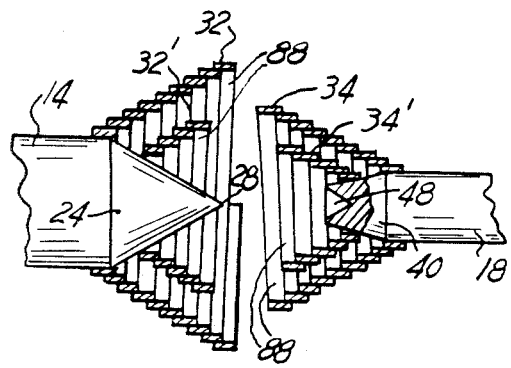
FIGS. 17-24 illustrate further modifications of pole piece extensions according to the invention.

FIG. 17 illustrates a pair of opposed pole pieces 14 and 18 each provided with a pair of co-axial frusto-conical helical pole piece extensions 32 and 32' associated with the pole piece 14, and 34 and 34' associated with the pole piece 18. Each pole piece extension is made of a thin ribbon 88 of magnetic material wound helically with consecutive overlapping spirals. Although the helical frusto-conical pole piece extensions 32 and 32' and 34 and 34' are substantially mutually parallel with equal angle of conicity, it will be appreciated that their angles of conicity may be different, that the consecutive spirals may be spaced apart, that more than two concentric helical frusto-conical extensions may be disposed around each pole piece, or that a single extension may be so disposed. FIG. 17 further illustrates an example of structure wherein the pole pieces 14, 18 are of different diameters, the pole piece 18 being of a smaller diameter than the pole piece 14, and wherein the tips of the pole pieces 14, 18 are different, the pole piece 14 terminating in a conical portion 24 provided with a sharp end 28, while the pole piece 18 terminates in a frusto-conical portion 40 ending in a circular end face provided with a conical cavity 48. Such an arrangement of pole pieces and pole piece extensions, as illustrated at FIG. 17, provides a magnetic field of generally conical shape. It will be appreciated that any arrangement of pole piece configurations, as provided by the present invention, and pole pieces of different diameters as illustrated at FIG. 17 can be used for obtaining concentrated and confined magnetic fields of diverse shapes.

Figure 18:
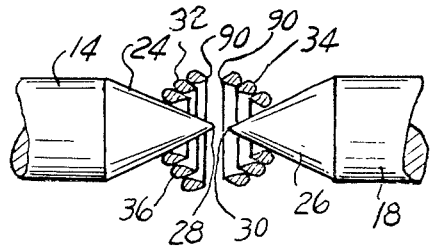

At FIG. 18 a pair of pole pieces 14-18 provided with a conical portion 24-26 are shielded by frusto-conical helical pole piece extensions 32-34, the helical pole piece extensions being fastened to the periphery of the pole piece conical portions 24-26 proximate the sharp tips 28-30 of the pole pieces. The magnetic wire 36 of which the pole piece extensions 32-34 are made has a generally triangular cross-section with an apex 90 of the triangular cross-section being oriented in a generally longitudinal direction.

Figure 19:
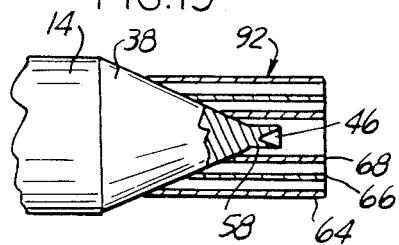
Figure 20:
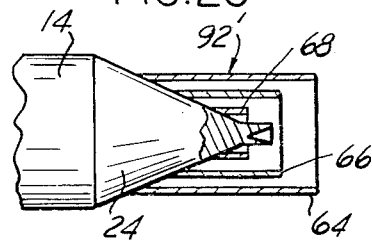

FIG. 19 illustrates an example of cylindrical pole piece extensions 92 made of a plurality of concentric tubular magnetic shields 64, 66 and 68 disposed coaxially to the cylindrical end portion 58 of the pole piece 14 and attached to the surface of the frusto-conical portion 38 of the pole piece. The end of the magnetic tubular members 64-68 are disposed in a single plane, while in the structure of FIG. 20 the tubular magnetic shield members 64-68 forming the pole piece extension 92 are progressively shorter from the outermost tubular member 64 to the innermost tubular member 68.

Figure 21:
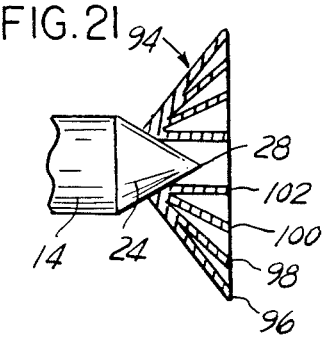
Figure 22:
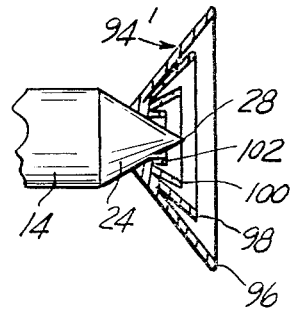

FIGS. 21-22 illustrate respectively a pole piece extension 94 and a pole piece extension 94' comprising a plurality of integrally formed conical magnetic shields 94-102 of decreasing conicity from the outermost shield 96 to the innermost shield 102, the innermost member 102 being substantially cylindrical, and the ends of the shields of FIG. 21 being disposed in a single plane, while at FIG. 22 the magnetic shields of the pole piece extension 94' are of progressively decreasing length from the outermost member to the innermost member.

Figure 23:
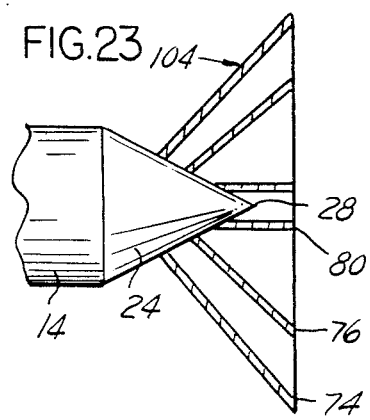
Figure 24:
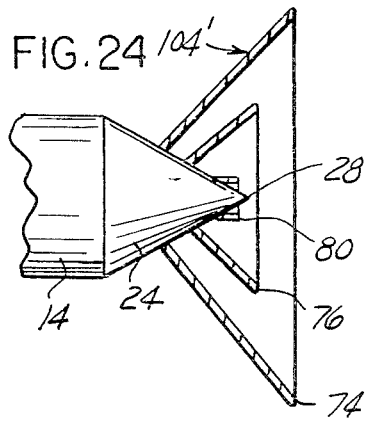

FIG. 23 illustrates a structure for a pole piece extension 104 substantially alike the structure of the pole piece extension 94 of FIG. 21, but made of separate conical magnetic shields 74-80, the inner shield 80 being substantially cylindrical, and all the magnetic shields having their free edges disposed in a single plane. The other end of the magnetic shields 74, 76 and 80 are attached separately to the surface of the conical portion 24 of the pole piece 14. The structure of the pole piece extension 104' of FIG. 24 is substantially like the structure of the pole piece extension 104 of FIG. 23, the magnetic shield elements 74-80 being however of decreasing length such as to have their edge staggered as in the structure of FIG. 22.

The pole piece extensions illustrated at FIGS. 17-24 are fastened to the conical surface of the pole piece by any convenient appropriate means such as by welding, preferably by laser welding.

The pole piece configurations of the invention, by themselves and preferably in conjunction with the magnetic confinement shields of the invention, permit to achieve high density concentrated magnetic fields wherein the maximum field intensity is disposed along a straight line between the sharp points of substantially conical pole pieces, or concentrated about the peripheral wall of a hollow cylinder interconnecting the pole piece faces. The magnetic shields, in addition to providing a straightening of the magnetic lines of force and a concentration of the magnetic lines of force, further provide a pinch-effect permitting to create an area of high magnetic intensity in the bubble chambers of particle detectors, in mass and NMR spectrometers, or permitting to establish and confine a plasma in MDH power generators and in nuclear fusion processes. More particularly in nuclear fusion processes, the high energy magnetic fields obtained by the invention permit to compress the plasma, by a toroidal magnetic effect within a cylindrical magnetic field, to produce the necessary densities required for fusion reaction between deuterons and tritons, and to keep the plasma away from the walls of the containing vessel. Whether plasma magnetic compression and confinement per se is used to fuse deuterons and tritons, or whether magnetic confinement of a critical mass of deuterons and tritons for firing by high power laser beams is used to effectuate the fusion reaction, the configuration of magnetic pole pieces and magnetic pole piece extensions of the present invention, incorporated in the structure of a superconductive electromagnet, are able to achieve the high ionic concentration and high velocity of ion motion required for achieving fusion reactions.

Having thus described the present invention by way of examples of structural configurations thereof, modifications whereof will be apparent to those skilled in the art, what is claimed as new is as follows:

1. In combination, a magnet pole piece having a frusto-conical end portion and a magnetic field correction member for the magnetic field formed by the magnet pole piece, said correction member comprising at least one hollow shield member attached to the frusto-conical end portion, said hollow shield member being made of magnetic material, wherein said hollow shield is in the form of a generally conical diverging helical strand of said magnetic material.

2. In combination, a magnet pole piece having a frusto-conical end portion and a magnetic field correction member for the magnetic field formed by the magnet pole piece, said correction member comprising at least one hollow shield member attached to the frusto-conical end portion of said pole piece and surrounding said pole piece frusto-conical end portion, wherein said hollow shield member is made of magnetic material and comprises a plurality of tubular cylindrical elements disposed concentrically about the periphery of said pole piece frusto-conical portion and projecting beyond the end of said pole piece, wherein said tubular cylindrical elements have progressively increasing wall thickness from the outermost element to the innermost element.

3. In combination, a magnet pole piece having a frusto-conical end portion and a magnetic field correction member for the magnetic field formed by the magnet pole piece, said correction member comprising at least one hollow shield member attached to the frusto-conical end portion of said pole piece and surrounding said pole piece frusto-conical end portion wherein said hollow shield member is made of magnetic material and comprises a plurality of tubular cylindrical elements disposed concentrically to each other about the periphery of said pole piece frusto-conical portion and projecting beyond the end of said pole piece, wherein said tubular cylindrical elements are frusto-conical and disposed substantially parallel to each other.

4. In combination, a magnet pole piece having a frusto-conical end portion and a magnetic field correction member for the magnetic field formed by the magnet pole piece, said correction member comprising at least one hollow shield member attached to the frusto-conical end portion of said pole piece and surrounding said pole piece frusto-conical end portion, wherein said hollow shield member is made of magnetic material and comprises a plurality of tubular cylindrical elements disposed contrically to each other about the periphery of said pole piece frusto-conical portion and projecting beyond the end of said pole piece, wherein said tubular cylindrical elements are frusto-conical and of decreasing conicity from the outermost of said elements to the innermost of said elements.

5. A method for confining and straightening a magnetic field produced in a gap between a pair of opposed pole pieces of a magnet, each of said pole pieces having an end face, said method comprising disposing a hollow pole piece extension surrounding each of said pole pieces and extending beyond the end of each of said pole pieces, said pole piece extension being made of magnetic material, providing the end face of at least one of said pole pieces with a recess forming an edge producing a concentrated straight magnetic flux of high magnetic intensity, and arranging said pole pieces extensions in such manner as to curve the magnetic lines of force proximate the periphery of said magnetic field towards the center of said magnetic field, wherein said pole piece extension is in the form of a progressively enlarging diameter shield of magnetic material.

6. The method of claim 5 wherein said progressively enlarging diameter shield is made in the form of a generally conical diverging helical strand of magnetic material.

7. The method of claim 5 wherein said progressively enlarging diameter shield is made in the form of a plurality of generally conical diverging separate solid tubular members.

8. A method for confining and straightening a magnetic field produced in a gap between a pair of opposed pole pieces of a magnet, each of said pole pieces having an end face, said method comprising disposing a hollow pole piece extension surrounding each of said pole pieces and extending beyond the end of each of said pole pieces, said pole piece extension being made of magnetic material, providing the end face of at least one of said pole pieces with a recess forming an edge producing a concentrated straight magnetic flux of high magnetic intensity, and arranging said pole piece extensions in such manner as to curve the magnetic line of forces proximate the periphery of said magnetic field towards the center of said magnetic field, wherein said pole pieces extensions are each in the form of a plurality of separate concentric tubular members of magnetic material.

9. A method for confining and straightening a magnetic field produced in a gap between a pair of opposed pole pieces of a magnet, said method comprising disposing a hollow pole piece extension surrounding each of said pole pieces and extending beyond the end of each of said pole pieces, said pole pieces extension being made of magnetic material, providing said pole pieces with an edge producing a concentrated straight magnetic flux of high magnetic intensity, and arranging said pole pieces extensions in such manner as to curve the magnetic lines of force proximate the periphery of said magnetic field towards the center of said magnetic field, wherein at least one of said pole piece extensions is made of a generally conical diverging helical strand of magnetic material.

* * * * *

UNITED STATES PATENT AND TRADEMARK OFFICE
CERTIFICATE OF CORRECTION

PATENT NO. : 4,359,706
DATED : November 16, 1982
INVENTOR(S) : Arnold Flack

It is certified that error appears in the above-identified patent and that said Letters Patent is hereby corrected as shown below:

Column 6, line 12, "92" should read -- 92' --;

line 17, "94" should read -- 96 --.

Signed and Sealed this

Twelfth Day of April 1983

[SEAL]

Attest:

GERALD J. MOSSINGHOFF

Attesting Officer    Commissioner of Patents and Trademarks